(12) United States Patent
Lamore

(10) Patent No.: US 10,236,670 B1
(45) Date of Patent: *Mar. 19, 2019

(54) CABLE HOUSING SYSTEM

(71) Applicant: Michael John Lamore, Greensboro, NC (US)

(72) Inventor: Michael John Lamore, Greensboro, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/704,381

(22) Filed: Sep. 14, 2017

Related U.S. Application Data

(63) Continuation of application No. 15/255,941, filed on Sep. 2, 2016, now Pat. No. 9,768,602, which is a continuation of application No. 11/957,642, filed on Dec. 17, 2007, now Pat. No. 9,441,337.

(51) Int. Cl.
*H02G 9/00* (2006.01)
*E01F 13/04* (2006.01)
*H02G 3/08* (2006.01)

(52) U.S. Cl.
CPC ............... *H02G 9/00* (2013.01); *E01F 13/04* (2013.01); *E01F 13/048* (2013.01); *H02G 3/08* (2013.01); *H02G 3/081* (2013.01)

(58) Field of Classification Search
CPC .. H02G 3/08; H02G 3/081; H02G 9/00; E01F 13/048; E01F 13/04
USPC ........... 404/6, 11, 48, 89, 2, 3; 49/9, 34, 49, 49/383; 174/135
See application file for complete search history.

(56) References Cited

U.S. PATENT DOCUMENTS

| | | | |
|---|---|---|---|
| 156,238 A | * | 10/1874 | Squyer |
| 319,112 A | * | 6/1885 | Nevius ................... E01F 13/046 404/6 |
| 1,353,591 A | | 9/1920 | Hope et al. |
| 1,652,186 A | | 12/1927 | Strauss |
| 1,653,487 A | | 12/1927 | White |
| 1,848,516 A | | 3/1932 | Davison |
| 2,192,369 A | | 3/1940 | Sparrow |
| 2,403,065 A | | 7/1946 | Engert |
| 2,504,635 A | | 12/1950 | Bradley |
| 2,957,657 A | | 10/1960 | Frieder et al. |
| 3,058,703 A | | 10/1962 | Fonden et al. |
| 3,722,140 A | | 3/1973 | Newton |

(Continued)

FOREIGN PATENT DOCUMENTS

FR    2792014 A1    10/2000

OTHER PUBLICATIONS

Cable Organizer.com, "Yellow Jacket Cable Protector—Extra Heavy Duty Protection," http://cableorganizer.com/cable-protector-yjack/, pp. 1-4, Feb. 6, 2005.

*Primary Examiner* — Abigail A Risic
(74) *Attorney, Agent, or Firm* — Additon, Higgins & Pendleton, P.A.

(57) ABSTRACT

A cable housing system includes a housing positioned below a travel path having a crown surface. A plurality of surface lid sections are connected to the housing. The surface lid sections generally lie flush with the surface crown of the travel path when in a closed position and define gaps between the surface lid sections when in an open position. A surface lid interlocking mechanism connects at least two adjacent surface lid sections, and an attachment mechanism provides for surface lid sections to be selectively moved relative to the housing.

20 Claims, 6 Drawing Sheets

(56) References Cited

U.S. PATENT DOCUMENTS

| | | | |
|---|---|---|---|
| 3,748,782 A | 7/1973 | Reynolds | |
| 4,275,910 A | 6/1981 | Budish | |
| 4,332,503 A | 6/1982 | Hurst, Jr. | |
| 4,502,812 A | 3/1985 | Zucker | |
| 4,567,851 A | 2/1986 | Larsen | |
| 4,576,507 A | 3/1986 | Terio | |
| 4,780,020 A | 10/1988 | Terio | |
| 4,824,282 A * | 4/1989 | Waldecker | E01F 13/046 404/6 |
| 4,844,653 A | 7/1989 | Dickinson | |
| 4,989,835 A | 2/1991 | Hirsh | |
| 5,066,165 A | 11/1991 | Wofford et al. | |
| 5,181,793 A * | 1/1993 | Hope | E01C 11/227 404/4 |
| 5,192,159 A | 3/1993 | Higginson | |
| 5,245,787 A * | 9/1993 | Strauss | E01F 13/028 404/9 |
| 5,267,367 A * | 12/1993 | White | A62C 33/06 14/69.5 |
| 5,459,963 A | 10/1995 | Alexander | |
| 5,466,088 A * | 11/1995 | Sparrow | E01F 13/08 404/6 |
| 5,762,443 A * | 6/1998 | Engert | B61L 29/023 246/473.1 |
| 5,890,613 A * | 4/1999 | Bradley | A45C 7/0045 220/23.4 |
| 6,079,898 A * | 6/2000 | St. Amant, III | A62C 33/06 404/6 |
| 6,224,291 B1 * | 5/2001 | Newton | E01F 13/123 404/6 |
| 6,322,486 B1 * | 11/2001 | Reynolds | B65B 19/228 493/183 |
| 6,382,869 B1 | 5/2002 | Dickinson | |
| 6,810,191 B2 * | 10/2004 | Budish | G02B 6/4459 174/68.3 |
| 6,843,613 B2 | 1/2005 | Gelfand et al. | |
| 6,845,589 B1 | 1/2005 | Thompson et al. | |
| 6,857,227 B2 | 2/2005 | Russell | |
| 6,860,678 B2 * | 3/2005 | Hurst, Jr. | E03F 3/046 404/2 |
| 6,942,419 B2 * | 9/2005 | Knak | E03F 5/06 210/163 |
| 6,997,036 B2 | 2/2006 | Kojima et al. | |
| 7,060,901 B2 * | 6/2006 | Herzog | H02G 3/0418 174/135 |
| 7,140,802 B2 | 11/2006 | Lamore | |
| 7,172,368 B2 * | 2/2007 | Wallace | E01C 19/506 249/11 |
| 7,195,419 B2 | 3/2007 | Gelfand | |
| 7,210,873 B2 | 5/2007 | Gelfand | |
| 7,214,000 B2 * | 5/2007 | Marsh | E01F 13/126 404/11 |
| 7,293,937 B2 * | 11/2007 | Fuchs | E02D 29/1427 404/2 |
| 7,332,672 B2 * | 2/2008 | Henry | H02G 3/383 174/68.1 |
| 7,377,716 B2 | 5/2008 | Gelfand | |
| 7,413,372 B2 * | 8/2008 | Meyers | E03F 3/046 404/2 |
| 7,441,983 B2 | 10/2008 | Gelfand | |
| 7,467,909 B2 * | 12/2008 | Orner, Jr. | E01F 13/044 404/6 |
| 7,484,905 B2 | 2/2009 | Gelfand et al. | |
| 7,530,759 B2 | 5/2009 | Gelfand et al. | |
| 7,641,416 B2 * | 1/2010 | Miracle | E01F 13/044 404/6 |
| 7,785,031 B2 | 8/2010 | Vellozzi et al. | |
| 7,964,796 B2 * | 6/2011 | Suzuki | B60R 16/0215 174/72 A |
| 9,441,337 B2 | 9/2016 | Lamore | |
| 9,768,602 B1 | 9/2017 | Lamore | |
| 2002/0182007 A1 | 12/2002 | Yodock et al. | |
| 2003/0016996 A1 | 1/2003 | Gelfand et al. | |
| 2007/0237577 A1 | 10/2007 | Gelfand et al. | |
| 2007/0258761 A1 * | 11/2007 | Orner, Jr. | E01F 13/044 404/6 |
| 2007/0264080 A1 * | 11/2007 | Miracle | E01F 13/044 404/6 |
| 2008/0073633 A1 | 3/2008 | Gelfand | |
| 2008/0075529 A1 | 3/2008 | Gelfand et al. | |
| 2009/0022546 A1 * | 1/2009 | Rastegar | E01F 13/123 404/6 |
| 2009/0116904 A1 | 5/2009 | Gelfand et al. | |
| 2009/0185857 A1 | 7/2009 | Gelfand et al. | |
| 2010/0275515 A1 | 11/2010 | Gelfand et al. | |

* cited by examiner

CABLE HOUSING SYSTEM

CROSS-REFERENCE TO RELATED APPLICATIONS

This application is a continuation of U.S. patent application Ser. No. 15/255,941 filed on Sep. 2, 2016, entitled CABLE HOUSING SYSTEM, which is a continuation of U.S. patent application Ser. No. 11/957,642 filed on Dec. 17, 2007, now U.S. Pat. No. 9,441,337, entitled CABLE HOUSING SYSTEM. The entire disclosure of the foregoing is incorporated herein by reference.

BACKGROUND OF THE INVENTION

Field of the Invention

The present invention is related to barriers and traffic control devices, and more particularly, an embedded and enclosed housing system which stores cables across a travel path and allows for selectively raising and lowering the cables to control traffic.

Description of Related Art

A cable housing system provides much utility by fully enclosing and protecting stored cables, and readily allowing the raising and lowering of the cables across a travel path for use as a barrier or traffic control device, and providing an unobstructed flush surface while the cables are in the stored position. Otherwise, the traffic control or barrier cable will lie above the surface across the travel path, exposed and accessible, or the cable must otherwise be completely removed from the travel path and stored elsewhere. The cable is raised and lowered in a vertical direction and is stored in the housing system extending in a longitudinal direction generally perpendicular to the travel path. Following the slope or crown across the travel path is necessary, so that the housing system remains flush with the adjacent surfaces.

In one method of related art, cables lie on the surface and are protected by covering them with a wider matting material which lies over top of the cable. The cable underneath creates a bump. The matting material wears out if traveled across frequently. The matting material must be adjusted or re-attached after raising the cable.

In another method of related art, cables are raised and lowered into grooves within a plastic mold embedded into the surface or pavement. The cables fall into the grooves when lowered. The cables are not covered by a lid when lying in the plastic mold, and are accessible from the surface and exposed. When the cables are lowered, the grooves are sometimes missed which results in the cable lying exposed above the travel path creating a surface obstruction which impedes snow plows, lawn mowers, bicycles, and vehicles traveling across. Rainwater collects inside the grooves since there is no lid or cover. Rainwater in the grooves turns to ice in freezing temperatures, resulting in a slippery surface across the travel path. Once ice forms inside the grooves, the cables will no longer lay inside when lowered.

Other related art does not provide adjustment for existing crowns or slopes across the travel path. Typically, asphalt and other surfaces across a travel path have existing crowns or slopes. Other related art is installed straight and level across a sloping travel path surface. Extensive sections of the travel path must be excavated and gradually tapered back into the existing sloping surfaces. This creates a depression in the travel path. The extensive excavation work required results in downtime of the travel path.

In other related art, the surface width of the installed housing system exceeds 24 inches, and creates caution in persons traveling across it, resulting in them slowing down. Heavy vehicles, such as tractor trailer loads, cannot typically be supported. This restricts use of the travel path to only light weight traffic.

BRIEF SUMMARY OF THE INVENTION

The invention addresses the above needs and achieves other advantages. The cable housing system is comprised of a hinging surface lid, and a below grade housing support structure. It is installed generally perpendicular to the travel path. The housing support structure is embedded below the grade level or pavement, and the hinging surface lid lies flush with the adjacent surface while in the closed position. The cable housing system extends in a longitudinal direction generally perpendicular to the travel path. The cable housing system is prefabricated in sections that are selectively attached to form a customized curved shape that follows the existing slope or crown across the travel path. The surface lid is typically only 8 inches wide and is readily opened or closed when raising or lowering the cable. Single or multiple connected cables are housed within the covered housing support structure embedded below the pavement surface, leaving the travel path unobstructed. The cables remain unexposed and protected while stored inside the housing support structure. Utility lines may also be stored inside. The surface lid may have ridges on its outside surface to enhance traction. The surface lid also functions to inhibit rain water from entering inside the housing support structure. However, if water seeps inside it will drain away by gravity since it is sloped. A heating element may be provided to melt ice forming inside the housing support structure. The housing system is durable and may be supported by a concrete foundation to support heavy vehicles, such as tractor trailers.

BRIEF DESCRIPTION OF SEVERAL VIEWS OF THE DRAWINGS

Figure 1:
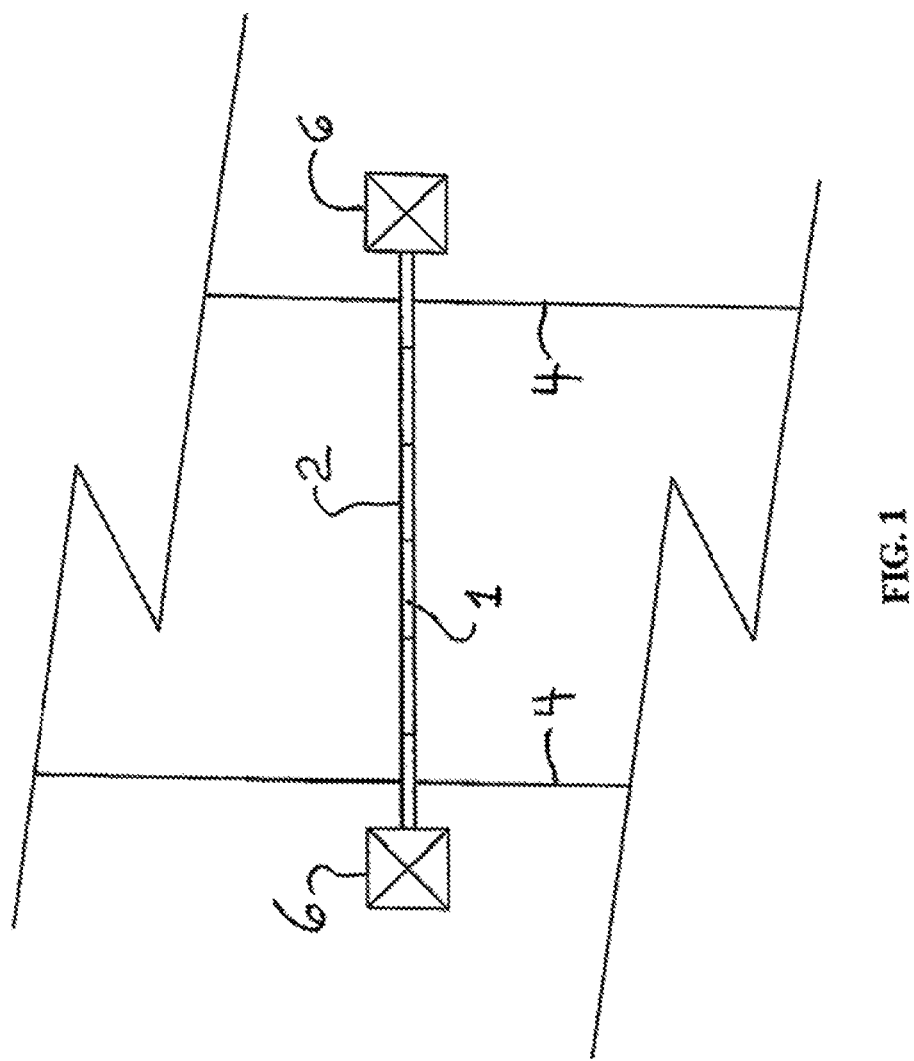
Figure 2:
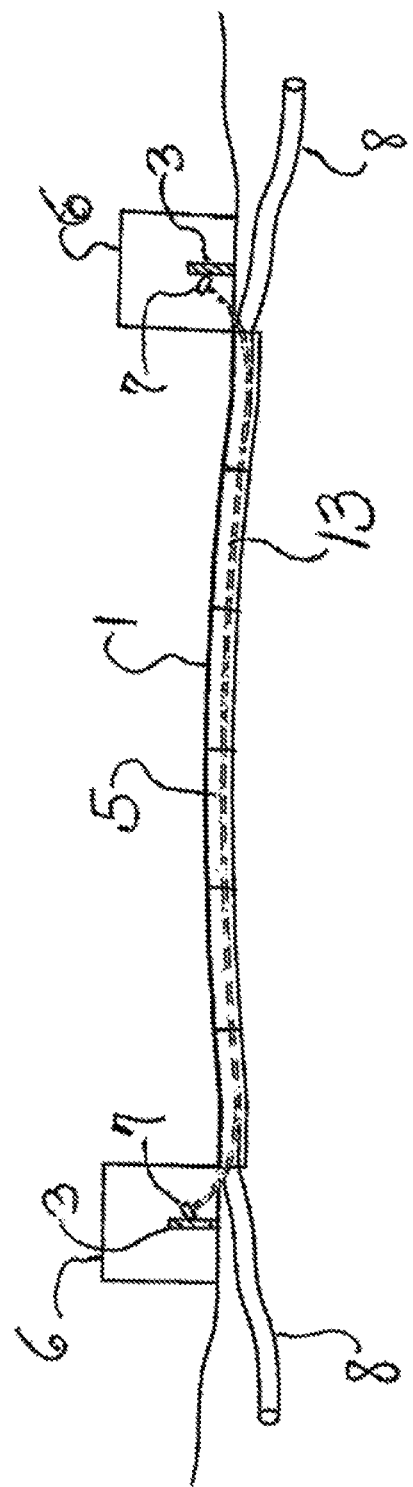
Figure 3:
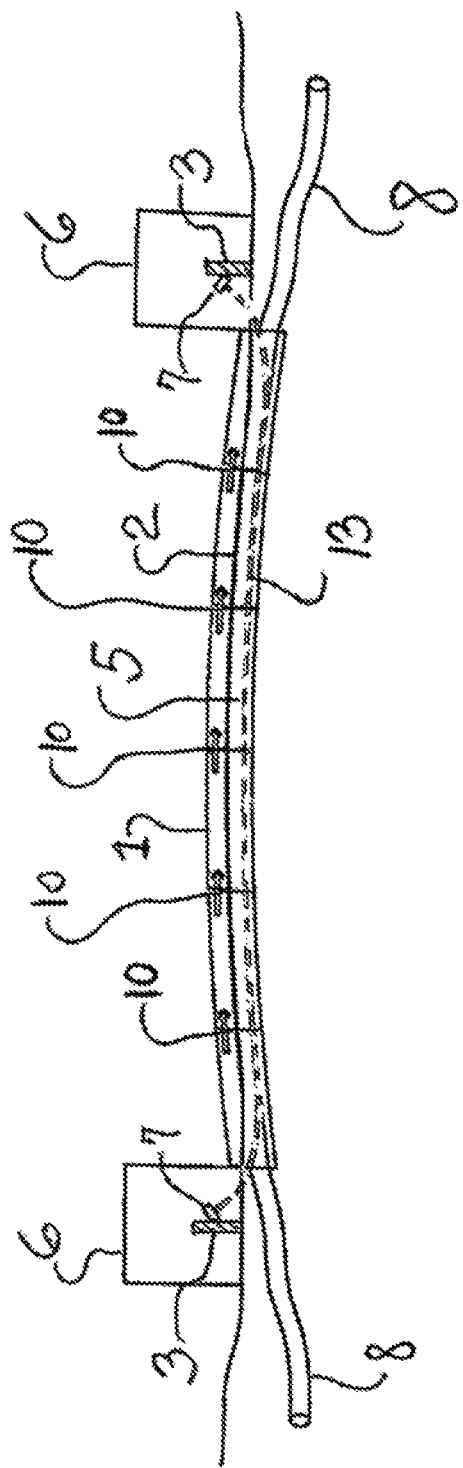
Figure 4:
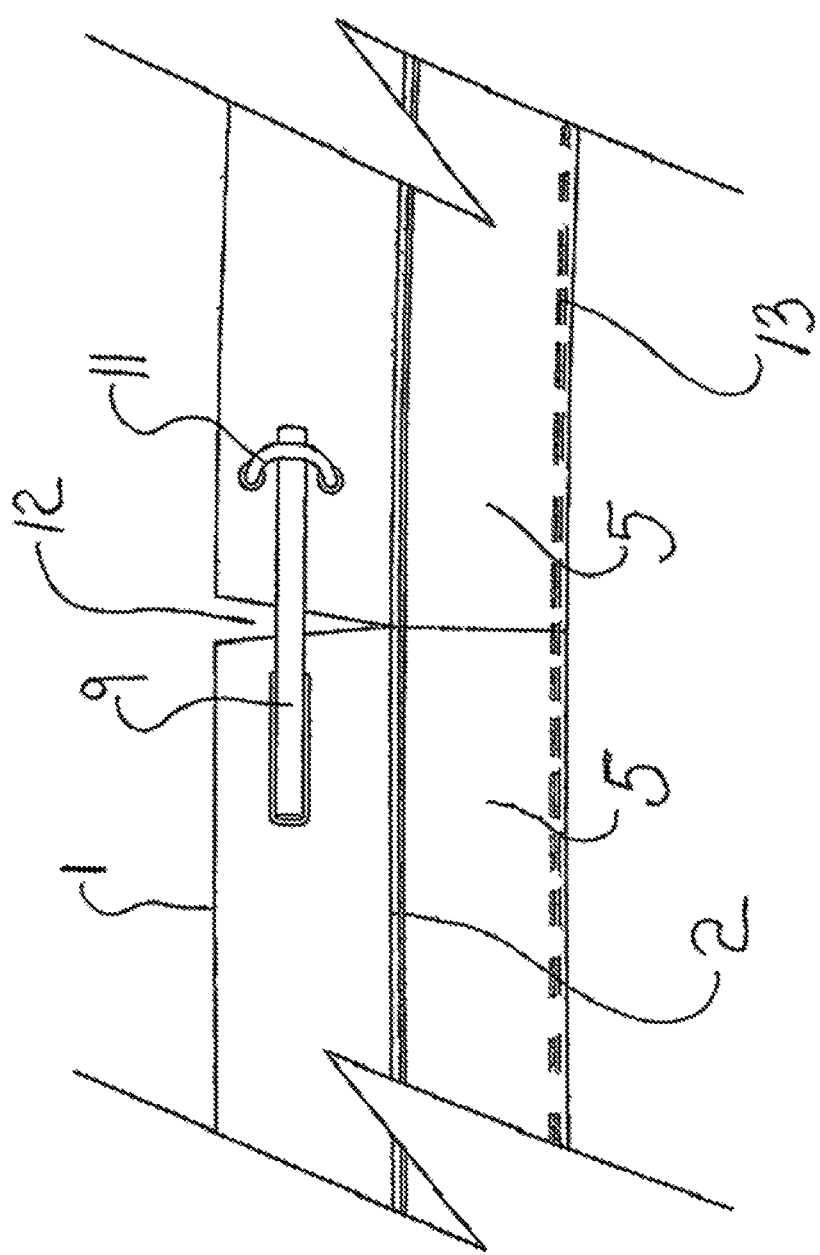
Figure 5:
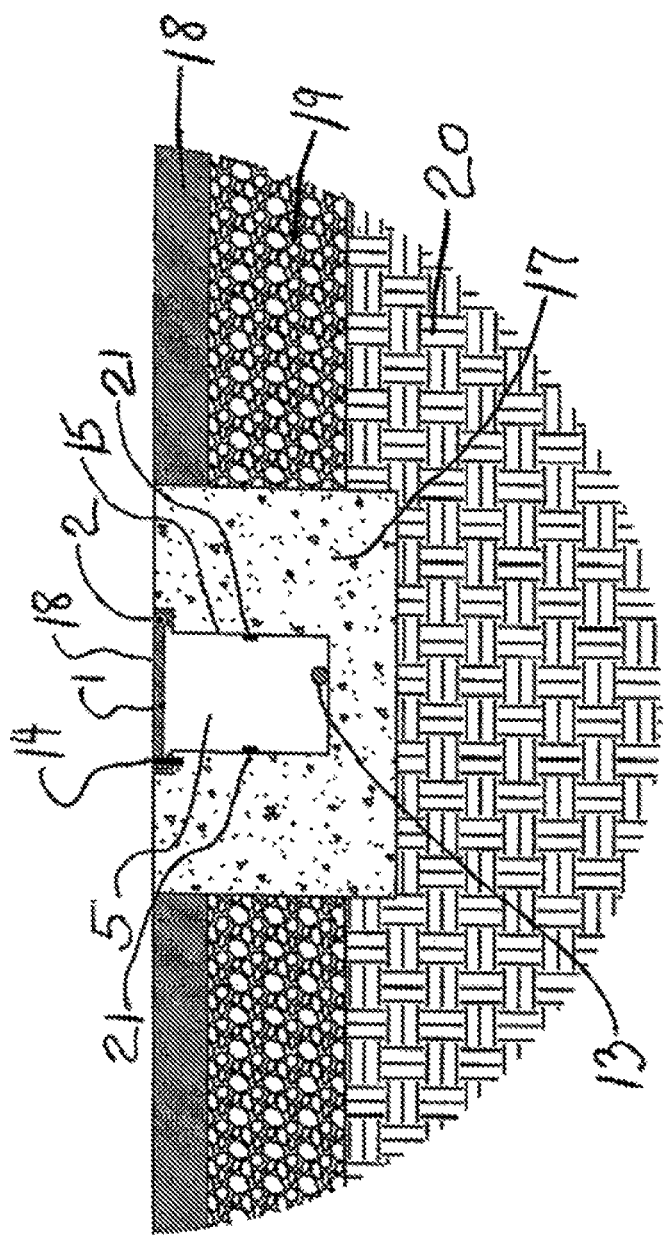
Figure 6:
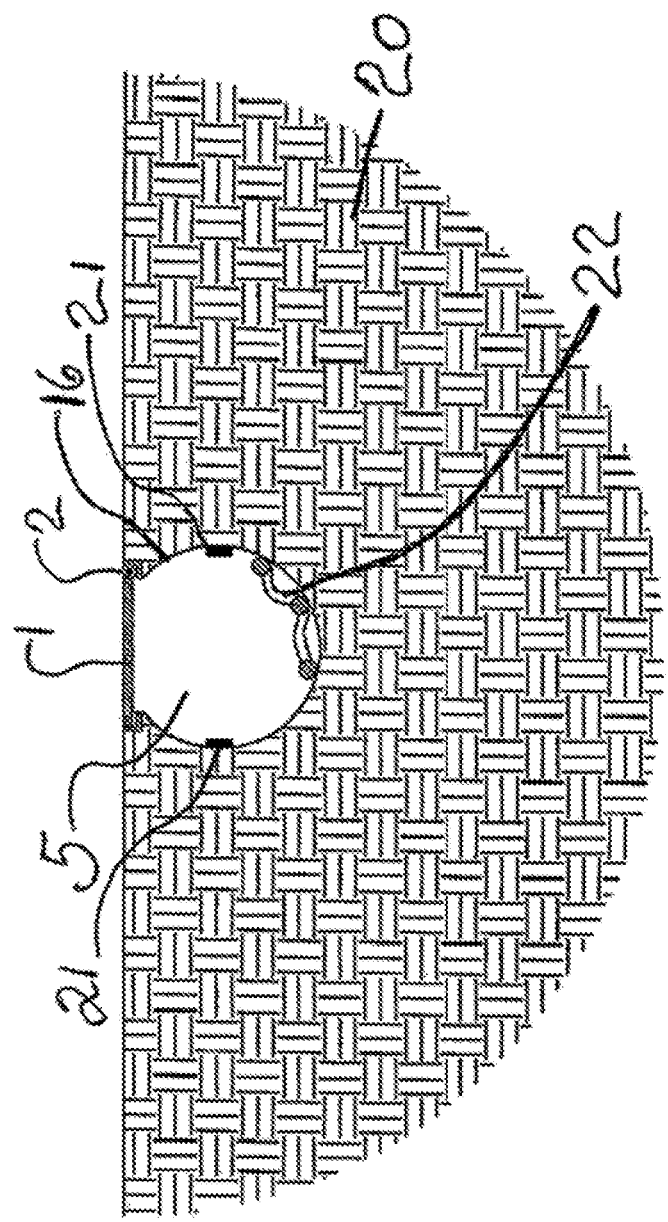

Having thus described the invention in general terms, reference will now be made to the accompanying drawings, which are not necessarily drawn to scale, and wherein:

FIG. 1 is a top elevation view of the cable housing system illustrating multiple surface lid sections connected across the travel path;

FIG. 2 is a front elevation view of the cable housing system of FIG. 1, illustrating the embedded housing support structure and drainage pipe, with the surface lid in the closed position:

FIG. 3 is a front elevation view of the cable housing system of FIG. 1, illustrating the embedded housing support structure and drainage pipe, with the surface lid in the open position;

FIG. 4 is a front elevation detail of two (2) adjacent surface lid sections in the open position and the lid interlocking mechanism;

FIG. 5 is cross sectional view of one embodiment of the cable housing system with rectangular shaped cross section embedded in a concrete foundation;

FIG. 6 is cross sectional view of a second embodiment of the cable housing system with a circular shaped cross section embedded in an earthen foundation;

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

With reference to FIGS. 1-6, various embodiments of the present invention are illustrated. The embedded cable housing system holds one or more cables below the surface so that traffic may pass without being obstructed. The cable housing has a hinging surface lid that protects the stored cable, and the lid remains flush with the adjacent surface when in the closed position. The surface lid may be locked when in the down position. As used herein, the term traffic comprises pedestrians, vehicles, motorcycles, bicycles, or the like to list non-limiting examples. The surface lid may have ridges on its outside surface for traction. The term cable comprises one (1) or more steel cables, ropes, net, synthetic fiber, straps, or the like to list several non-limiting examples. The cable is raised generally in a vertical direction to obstruct traffic. The term travel path comprises the area where traffic passes, where the surface may be asphalt, concrete, earth gravel, or the like to list non-limiting examples. The present invention may extend relatively long distances perpendicular to the travel path, such as distances of forty feet or more, to list one non-limiting example. The cable is selected based on the type of traffic to obstruct. Ends of the cables may contain a handle, hook, or other attachment to facilitate raising, lowering, and attaching the cable to an end support.

Refer now to the surface lid 1 of FIG. 1 in the closed position and divided into sections. The surface lid sections may be comprised of steel, titanium, high density plastic, or the like to list non-limiting examples, and the thickness of the lid varies depending upon the application. The surface lid extends generally perpendicular across the travel path's outside borders 4 of FIG. 1. The travel path will vary in width and type of surface. The surface lid is connected to the embedded housing support structure 5 of FIG. 2 by an attachment mechanism 2 of FIG. 1. The attachment mechanism 2 allows the lid to open and close. Non-limiting examples of the attachment mechanism include a hinge and pin connection and sliding lid with groove connection. The attachment mechanism may incorporate a stopping device so that the lid opens less than 90 degrees perpendicular to the surface of the travel path, so that it closes automatically by gravity. The lid may be locked while in the closed position. One non-limiting example of a locking device is a nonstandard bolt 14 of FIG. 5 screwed down through the lid into the concrete subsurface, that has a specialized head requiring a nonstandard tool to remove and install the bolt. Enclosed within the housing support structure is a single cable 13 of FIG. 5 or multiple cables 22 of FIG. 6. The cables remain unexposed and protected while enclosed within the housing support structure. The enclosed cable may be raised either by hand or using a lifting device such as a winch. Once raised to obstruct traffic across the travel path, ends of the cables may be fastened to an end support 3 of FIG. 2. Non-limiting examples of end support include a pole, truck trailer hitch, concrete jersey barrier, steel structure, and bollard. Ends of the cables may have a handle or connection device 7 of FIG. 2 to facilitate raising and lowering the cable, and securing it to the end support. The end support may have a cover 6 of FIG. 2. Consecutive sections of the housing support structure 5 of FIG. 4 are prefabricated, and then selectively attached using watertight connection to prevent subsurface infiltration of water. After prefabrication is complete, the support structure is installed to match the existing crown or slope across the travel path. The attached surface lid lies approximately flush with the adjacent surfaces. The outside surface of the lid may have non-skid surface 18 of FIG. 5 to enhance traction. Rainwater which may seep into the embedded housing support structure will drain away by gravity, and the flexible drainage pipe 8 of FIG. 2 carries the water away from the travel path.

A surface lid interlocking mechanism 10 of FIG. 3 connects consecutive sections of the surface lid. Because the embedded housing support structure is sloped, the attached surface lid sections separate when opening and a gap forms 12 of FIG. 4. The lid interlocking mechanism is comprised of a horizontal pin 9 of FIG. 4 attached to the underside of one lid section, and a receiving stay 11 of FIG. 4 attached to the underside of the adjacent lid section. As the lid sections open, the horizontal pin slides laterally through the receiving stay allowing the adjacent lid sections to separate while still remaining connected. Because of the interlocking mechanism, the divided lid sections remain connected while opening simultaneously. All divided lid sections remain connected while opening simultaneously across the crowned or sloping travel path.

The embedded housing support structure may be comprised of steel, high density plastic, or the like to list non-limiting examples. The embedded structure may be protected against rusting and corrosion using paint, galvanized coating, rubber coating, tar, sacrificial anode or combination thereof to list non-limiting examples. The embedded housing support structure may be rectangular in shape 15 of FIG. 5 and embedded in concrete 17 of FIG. 5. This embodiment provides for passage of heavy traffic and loads across the travel path. Here, the adjacent surface is asphalt 18 of FIG. 5 with stone base 19 and earthen sub-base 20. In another embodiment, the embedded housing support structure is round in shape 16 of FIG. 6 and embedded in earth 20 of FIG. 6. A heating element 21 of FIG. 5 may be attached to the inside wall of the embedded housing support structure to melt snow or ice.

Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable housing system comprising:
a housing positioned below a travel path, the travel path defining a surface crown across the travel path, wherein said housing comprises housing sections that connect to follow the surface crown across the travel path;
a plurality of surface lid sections connected to said housing, said surface lid sections generally lying flush with the surface crown of the travel path when in a closed position and defining gaps between the surface lid sections in an open position to accommodate the closed position with the surface lid sections following the surface crown across the travel path;

at least one surface lid interlocking mechanism connecting at least two adjacent surface lid sections, said interlocking mechanism comprising a horizontal member attached to an underside of one lid section and a receiving stay attached to an adjacent underside of an adjacent lid section so that the horizontal member extends into the adjacent receiving stay, wherein said interlocking mechanism connects the adjacent surface lid sections across the respective gap formed by moving both adjacent surface lid sections from the closed position to the opened position;

at least one attachment mechanism connecting at least one of the surface lid sections to said housing, such that the attachment mechanism provides for the at least one of the surface lid section to be selectively moved relative to said housing; and a cable that is stored in the housing when not raised.

2. A cable housing system according to claim 1, further comprising end supports positioned adjacent opposite sides of the travel path and extending above the grade level of the travel path, wherein said end supports are connected to the cable stored in said housing and adapted to raise and lower said cable.

3. A cable housing system according to claim 2, wherein said cable is a single continuous cable of sufficient length such that, when said housing is closed, said cable extends from inside said housing to points on said end supports above grade level of the travel path.

4. A cable housing system according to claim 1 wherein the lid sections move from the opened position to the closed position by gravity.

5. A cable housing system according to claim 1 wherein the surface lid sections have an outside surface, said surface having ridges for enhancing traction of a vehicle.

6. A cable housing system according to claim 1 wherein the horizontal member is a horizontal pin.

7. A cable housing system according to claim 1 wherein a heating element is located within the housing.

8. A cable housing system according to claim 1 wherein the housing is about eight inches wide.

9. A cable housing system according to claim 1 wherein the surface lid sections may be locked while in the closed position.

10. A cable housing system according to claim 1 wherein the horizontal member is so dimensioned as to span across the gap to connect with the receiving stay in an open position.

11. A cable housing system comprising:
a housing for positioning under the travel surface, said housing having opposed ends and said travel surface defining a crown, wherein said housing comprises housing sections that connect to follow the surface crown across the travel path;
a plurality of surface lid sections connected to said housing, said surface lid sections generally lying flush with the surface of the travel path when in the closed position and defining gaps between the surface lid sections in an open position to accommodate the closed position with the surface lid sections following the surface crown across the travel path;
a respective horizontal member connected to all of the surface lid sections except one surface lid section positioned at one of said opposed ends of the housing said horizontal member extending under an adjacent surface lid section and a receiving stay attached to an underside of an adjacent lid section so that the horizontal member extends into the adjacent receiving stay; wherein said horizontal members and said adjacent receiving stays connect the adjacent surface lid sections across the respective gap formed by moving both adjacent surface lid sections from the closed position to the opened position;
at least one attachment mechanism connecting the at least one surface lid section to said housing, such that said attachment mechanism provides for the at least one surface lid section to be selectively moved relative to said housing; and
a cable stored in said housing when not raised.

12. A cable housing system according to claim 11, further comprising end supports positioned adjacent opposite sides of the travel path and extending above the grade level of the travel path, wherein said end supports are connected to the cable stored in said housing and adapted to raise and lower said cable.

13. A cable housing system according to claim 11, wherein said horizontal member slidably engages an adjacent surface lid section as a surface lid section opens or closes.

14. A cable housing system according to claim 12, wherein said cable is a single continuous cable of sufficient length such that, when said housing is closed, said cable extends from inside said housing to points on said end supports above grade level of the travel path.

15. A cable housing system according to claim 11, wherein said attachment mechanism comprising a stopping device allowing said surface lid sections to open to an angle that is less than about 90 degrees relative to said housing.

16. A cable housing system according to claim 11 wherein the lid sections move from the opened position to the closed position by gravity.

17. A cable housing system according to claim 11 wherein the surface lid sections have an outside surface, said surface having ridges for enhancing traction of a vehicle.

18. A cable housing system according to claim 11 wherein a heating element is located within the housing.

19. A cable housing system according to claim 11 wherein the horizontal member is a pin.

20. A cable housing system according to claim 11 wherein the surface lid sections may be locked while in the closed position.

* * * * *